United States Patent Office 3,497,489
Patented Feb. 24, 1970

3,497,489
POLYMERIZATION PROCESS RESULTING IN A LIGHT-COLORED, SUNLIGHT STABLE HIGH-CIS POLYBUTADIENE
William M. Saltman and Robert W. Stachowiak, Akron, Ohio, assignors to The Goodyear Tire & Rubber Company, Akron, Ohio, a corporation of Ohio
No Drawing. Filed Dec. 6, 1966, Ser. No. 599,359
Int. Cl. C08d 1/14
U.S. Cl. 260—94.3      10 Claims

ABSTRACT OF THE DISCLOSURE

A process of polymerizing butadiene by means of organo aluminum compounds-titanium halide catalyst in which the polymer chain growth reaction is stopped or terminated by means of alkali metal alcoholates or alkali metal hydroxides to produce high cis-1,4 polybutadiene possessing improved color and sunlight stability and without any change in polymer molecular weight.

BACKGROUND OF THE INVENTION

This invention relates to the preparation of high cis-1,4 polybutadiene with improved color and sunlight stability. It relates to a method for stopping the polymerization chain growth reaction by the use of alkali metal alcoholates or alkali metal hydroxides to produce such polybutadienes. The invention will be described in connection with the solution polymerization of butadiene-1,3 in an inert liquid organic medium to form high cis-1,4 polybutadiene by means of certain stereospecific catalysts such as mixtures of titanium tetraiodide and organo aluminum compounds or mixtures of titanium tetrachloride, organo aluminum compounds and iodine.

Desirable features of a finished polymer of high cis-1,4 polybutadiene include a light color, a translucent or transparent quality, and the ability of the polymer to retain a light color after sustained exposure to ultraviolet light, particularly upon exposure to sunlight.

Previous processes used for other polymers have resulted in products of increased molecular weight. In this case this is very undesirable since it creates great difficulties in subsequent processing. Previous processes for preparing high cis-1,4 polybutadiene using, for example, a rosin acid as a stopping agent in combination with a conventional rubber antioxidant have resulted in yellowish or brown colored polymers. The use of polyamines, such as tetraethylene pentamine (TEPA) as a chain stopper produces a polymer of dark color whereas triisopropanol amine (TIPA) produces a finished polymer with good initial color but which later yellows on exposure for a few hours to the ultra violet light rays of sunlight.

OBJECTS OF INVENTION

It is, therefore, an object of this invention to produce a finished high cis-1,4 polybutadiene polymer with a good light initial color. Another object is to produce a finished high cis-1,4 polybutadiene polymer with good color retention after sustained exposure to the ultraviolet rays of sunlight. Another object is to produce a finished polybutadiene without any undesirable increase in molecular weight. Other objectives will appear as the description proceeds.

SUMMARY OF INVENTION

The invention is an improvement in a process for polymerizing butadiene-1,3 to form high cis-1,4 polybutadiene which comprises contacting butadiene in an inert solvent under polymerization conditions with a catalyst system selected from the group consisting of (1) a mixture of titanium tetraiodide and an organo aluminum compound and (2) a mixture of titanium tetrachloride, iodine and an organo aluminum compound, which improvement comprises stopping the chain growth reaction by the addition of at least one material selected from the group consisting of alkali metal alcoholates and alkali metal hydroxides, thereby producing a light colored, sunlight stable, high cis-1,4 polybutadiene, and recovering the high cis-1,4 polybutadiene.

DESCRIPTION OF INVENTION

The catalyst system employed to polymerize butadiene to high cis-1,4 polybutadiene is, as indicated above, a mixture of organo aluminum compounds and titanium tetraiodide, or mixtures of organo aluminum compounds, titanium tetrachloride, and iodine.

The preferred organo aluminum compounds can be represented by the formula $AlR_3$ wherein R is an alkyl, cycloalkyl, aryl, alkaryl, or aralkyl radical. These radicals contain from 1 to about 20 carbon atoms. Representative examples of such compounds are triorgano aluminum compounds such as triethyl aluminum, tri-n-propyl aluminum, tri-n-butyl aluminum, triisobutyl aluminum, trihexyl aluminum, trioctyl aluminum, tricyclohexyl aluminum, triphenyl aluminum, tri-p-tolyl aluminum, ethyl diphenyl aluminum, diethyl phenyl aluminum, tribenzyl aluminum, diethyl benzyl aluminum, and di-t-butyl phenyl aluminum.

The titanium tetrachloride and titanium tetraiodide compounds employed in the catalyst system should be as pure as can economicaly be obtained. They should be essentially free of moisture and other deleterious substances. The elemental iodine should be essentially chemically pure material.

When the catalyst system employed to polymerize the butadiene is a mixture of titanium tetraiodide and an organo aluminum compound, the two components are employed in amounts so that the Al/Ti mole ratio ranges broadly between about 2 and about 20. A more preferable mole ratio range is from about 3 to 10.

When the catalyst employed is a mixture of titanium tetrachloride, an organo aluminum compound and iodine, the ingredients are employed in amounts so that the Al/Ti mole ratio ranges from about 5 to about 20 with a mole ratio of from about 7 to about 12 being preferred, and the mole ratio of $Ti/I_2$ should range from about 0.2 to about 2.0 with about 0.5 to about 1.0 being preferred.

The amount of catalyst employed to polymerize the butadiene, of course, depends on the polymerization conditions, purity of the system and other factors. Of course, sufficient catalyst must be employed to cause the polymerization to take place. It has been found that satisfactory polymerization will occur when amounts of catalyst such as 0.2 millimole of Ti per hundred grams of butadiene are used.

The polymerization process can be carried out under rather wide ranges of temperature such as —100° C. up to 100° C. However, it is usually preferred to operate at more moderate temperatures such as 30 to 60° C. The polymerization may be carried out under the autogenous pressure of the system, or an inert material may be added to aid in controlling the pressure of the system.

It is usually desirable to conduct the polymerization of butadiene in the presence of an inert hydrocarbon diluent or solvent. These inert diluents may be any suitable diluent so long as the diluent does not adversely affect the polymerization reaction. Representative of these diluents are the aliphatic hydrocarbons such as hexane, heptane, pentane, isooctane and the like; cycloparaffins such as cyclohexane;

aromatic hydrocarbons such as benzene, toluene and the like. Mixtures of these hydrocarbons may also be used. Of the inert hydrocarbon diluents, it is usually preferred to use an aromatic solvent such as benzene.

When a diluent or solvent is employed, the solvent/monomer volume ratios have not been found to be critical and may vary over wide ranges. For example, up to 20 or more to 1 volume ratio of solvent to monomer can be employed. Usually, however, it is preferred to use a solvent/monomer volume ratio of from about 3/1 to about 6/1. The polymerization may also be carried out in bulk. The polymerization can be either batch or continuous.

In conducting the polymerizations to which this invention is directed, it is usually desirable to employ air-free and moisture-free techniques. The catalyst systems employed are sensitive to the effects of oxygen and moisture. Procedures for air-free and moisture-free techniques are known in the art and will not be discussed here in detail.

The alkali metal compounds which are added as stopping agents to the reaction mixture after the desired level of polymerization is achieved, are selected from the group consisting of alkali metal alcoholates and alkali metal hydroxides. The alkali metal alcoholates may be represented by the formula MOR, wherein M is an alkali metal, representative of which are lithium, sodium, potassium, rubidium and cesium, and R represents alkyl, cycloalkyl, aryl, aralkyl, or alkaryl radicals which contains preferably from 1 to 20 carbon atoms. Representatives of suitable R radicals include methyl, ethyl, n-propyl, isopropyl, butyl, isobutyl, tertiary butyl, n-pentyl, n-hexyl, dodecyl, tridecyl, cyclopentyl, cyclohexyl, methyl-cyclohexyl, phenyl, benzyl, 4-tolyl, 2,4,6-trimethyl phenyl, 2-phenyl ethyl, 1-naphthyl and 2-naphthyl. The alkali metal hydroxides may be represented by the formula MOH wherein M represents an alkali metal as previously described, O is oxygen and H is hydrogen. Although any of the alkali metal metal hydroxides can be used in the practice of the process, sodium, potassium, and lithium hydroxides are preferred.

The alkali metal alcoholates and alkali metal hydroxides may be added in any form. However, they are more conveniently added to the reaction mixture as solutions or suspensions. It is usually preferred to add them as a solution in an alcohol. Representative of suitable alcohols are methyl, ethyl, n-propyl, isopropyl, n-butyl, sec. butyl, tertiary butyl and hexyl alcohols.

The amount of alkali metal alcoholates or alkali metal hyrroxide which is preferably used as a stopping agent is usually calculated with reference to the amount of titanium present in the catalyst system. From 0.5 to 40.0 moles of alkali metal alcoholate or alkali metal hydroxide per mole of titanium have been used with success. A preferred ratio is 4 moles of stopping agent per mole of titanium. If the stopping agent is added to the reaction mixture as an alcohol solution, the concentration of the stopping agent may vary from a very dilute solution of 0.5 percent to a concentrated solution of 50 percent by weight. Although there is no upper or lower limit to the concentration of alcoholic alkoxide or alcoholic hydroxide solutions which may be used, it has been found that a 25 percent solution is a convenient concentration to use.

SPECIFIC EMBODIMENTS

The practice of this invention is further described and illustrated by reference to the following examples which are intended to be illustrative rather than restrictive.

Example I

In these polymerizations, solutions of butadiene and benzene containing 10 grams of butadiene per 100 milliliters of solution were placed in suitable polymerization vessels. To each of the polymerization vessels was added sufficient amounts of triisobutyl aluminum and titanium tetraiodide so that the aluminum/titanium mole ratio was 5/1 and the total catalyst was 0.75 part per hundred parts of butadiene (p.h.m.) by weight. The polymerizations were then allowed to take place for 2 hours at 50° C. at which time the various stopping agents as shown in the tables below were added in the amounts indicated.

The polybutadiene was isolated by conventional techniques. Color, dilute soltuion viscosity (DSV), percent gel, and percent ash were determined by standard procedures. The results are set forth in the tables below wherein column 1 is the stopping agent; column 2 is the amount of stopping agent employed; column 3 is the color as determined on the Gardner Color Scale (the lower the number, the lighter the color); column 4 is the dilute solution viscosity (DSV); column 5 is the percent gel; and column 6 is the percent ash.

TABLE 1

| 1 | 2 | 3 | 4 | 5 | 6 |
|---|---|---|---|---|---|
| Stopping agent | Amount | Gardner color | DSV | Percent gel | Percent ash |
| Rosin acid | 1.0 p.h.m.* | 30.4 | 2.19 | 3.2 | 0.28 |
| TIPA | 1.2 p.h.m.* | 14.5 | 2.20 | 4.5 | 0.18 |
| NaOH/MeOH | 4.0 moles/mol Ti | 12.5 | 2.52 | 2.5 | 0.23 |

*Parts per 100 parts of butadiene by weight.

Example II

Polymerizations were conducted as in Example I except the polybutadiene/benzene solution obtained was washed with water prior to isolation. The results are set forth in Table 2 below in which the description is the same as that of Table 1.

TABLE 2

| 1 | 2 | 3 | 4 | 5 | 6 |
|---|---|---|---|---|---|
| Stopping agent | Amount | Gardner color | DSV | Percent gel | Percent ash |
| Rosin acid | 1.0 p.h.m.* | 33.6 | 2.04 | 2.5 | 0.16 |
| TIPA | 1.2 p.h.m.* | 17.6 | 2.67 | 3.8 | 0.17 |
| NaOH/MeOH | 4.0 moles/mol Ti | 11.7 | 2.40 | 3.6 | 0.22 |
| NaOMe/MeOH | do | 15.0 | 2.55 | 2.9 | 0.20 |

*Parts per 100 parts of butadiene by weight.

Example III

These polymerizations were carried out in a manner similar to those described in Example I except the catalyst system used differed. To each of the polymerization vessels containing the butadiene and benzene, prepared as in Example I, was added triisobutyl aluminum, followed by titanium tetrachloride and iodine ($I_2$) in amounts so that the Al/$I_2$/Ti mole ratio is 8/1.5/1.0 and the total amount of catalyst is 0.75 p.h.m. The results are set forth in Table 3 for which the description is the same as given for Table 1.

TABLE 3

| 1 | 2 | 3 | 4 | 5 | 6 |
|---|---|---|---|---|---|
| Stopping agent | Amount | Gardner color | DSV | Percent gel | Percent ash |
| Rosin acid | 1.0 p.h.m.* | 17.8 | 2.31 | 2.0 | 0.21 |
| TIPA | 1.2 p.h.m.* | 8.4 | 2.31 | 4.1 | 0.22 |
| NaOH/MeOH | 4.0 moles/mol Ti | 15.1 | 2.39 | 2.3 | 0.29 |
| NaOMe/MeOH | do | 10.8 | 2.39 | 3.1 | 0.29 |

*Parts per 100 parts butadiene by weight.

Example IV

Polymerizations were conducted as in Example III except that the polybutadiene/benzene solution obtained was washed with water prior to isolation. The results are set forth in Table 4 for which the description is the same as that for Table 1.

TABLE 4

| 1 | 2 | 3 | 4 | 5 | 6 |
|---|---|---|---|---|---|
| Stopping agent | Amount | Gardner color | DSV | Percent gel | Percent ash |
| Rosin Acid | 1.0 p.h.m.* | 29.6 | 2.27 | 2.0 | 0.17 |
| TIPA | 1.2 p.h.m.* | 11.4 | 2.33 | 2.9 | 0.18 |
| NaOH/MeOH | 4.0 moles/mol Ti | 11.1 | 2.33 | 3.2 | 0.21 |
| NaOMe/MeOH | do | 8.1 | 2.53 | 3.3 | 0.23 |

*Parts per 100 parts of butadiene monomer.

Thus, the examples above illustrate that the termination of the polymerization by either alcohol solutions of alkali metal alcoholates or alcohol solutions of alkali metal hydroxides results in an improved high cis-1,4 polybutadiene which is light in initial color, and which light color has been found to be stable when exposed to sunlight. These termination methods also result in high cis-1,4 polybutadiene polymers where no significant change in molecular weight as indicated by the dilute solution viscosity and no change in related physical properties have been observed, especially when compared with conventionally stopped high cis-1,4 polybutadiene.

While certain representative embodiments and details have been shown for the purpose of illustrating the invention it will be apparent to those skilled in this art that various changes and modifications may be made therein without departing from the spirit or scope of the invention.

What is claimed is:

1. In a process for polymerizing butadiene-1,3 to form high cis 1,4-polybutadiene which comprises contacting butadiene in an inert solvent under polymerization conditions with a catalyst system selected from the group consisting of (1) a mixture of titanium tetraiodide and an organo aluminum compound and (2) a mixture of titanium tetrachloride, iodine and an organo aluminum compound, the improvement comprising stopping the chain growth reaction by the addition of at least one material selected from the group consisting of alkali metal alcoholates and alkali metal hydroxides, thereby producing a light colored, sunlight stable, high cis-1,4 polybutadiene and recovering the high cis-1,4 polybutadiene.

2. The process according to claim 1 wherein the alkali metal alcoholate is sodium methoxide.

3. The process according to claim 1 wherein the alkali metal alcoholate is potassium methoxide.

4. The process according to claim 1 wherein the alkali metal hydroxide is sodium hydroxide.

5. The process according to claim 1 wherein the alkali metal hydroxide is potassium hydroxide.

6. The process according to claim 1 wherein the alkali metal alcoholate is sodium isopropoxide.

7. The process according to claim 1 wherein the alkali metal alcoholate is lithium ethoxide.

8. The process according to claim 1 wherein the alkali metal hydroxide is lithium hydroxide.

9. The process according to claim 1 wherein the material added to stop the chain growth reaction is an alkali metal alcoholate which is dissolved in an alcohol selected from the group consisting of methyl, ethyl, n-propyl, isopropyl, butyl, isobutyl, tertiary butyl, n-pentyl, n-hexyl, dodecyl, tridecyl, cyclopentyl, cyclohexyl, methyl-cyclohexyl, phenyl, benzyl, 4-tolyl, 2,4,6-trimethyl phenyl, 2-phenyl ethyl, 1-naphthyl, and 2-naphthyl alcohols.

10. The process according to claim 1 wherein the material added to stop the chain growth reaction is an alkali metal hydroxide dissolved in an alcohol selected from the group consisting of methyl, ethyl, n-propyl, isopropyl, butyl, isobutyl, tertiary butyl, n-pentyl, n-hexyl, dodecyl, tridecyl, cyclopentyl, cyclohexyl, methyl - cyclo - hexyl, phenyl, benzyl, 4-tolyl, 2,4,6-trimethyl phenyl, 2-phenyl ethyl, 1-naphthyl, and 2-naphthyl alcohols.

References Cited

UNITED STATES PATENTS

| | | | |
|---|---|---|---|
| 3,205,213 | 9/1965 | Stearns et al. | 260—94.3 |
| 3,180,858 | 4/1965 | Farrar | 260—94.3 |
| 3,256,262 | 6/1966 | Irvin | 260—94.3 |

JOSEPH L. SCHOFER, Primary Examiner

R. A. GAITHER, Assistant Examiner

U.S. Cl. X.R.

260—94.7